US012781554B2

(12) United States Patent
Fabiano

(10) Patent No.: US 12,781,554 B2
(45) Date of Patent: Nov. 3, 2026

(54) VEHICLE SLIDING DOOR ASSEMBLY, AND METHODS OF MAKING AND USING SAME

(71) Applicant: MORGAN OLSON LLC, Sturgis, MI (US)

(72) Inventor: Frank A. Fabiano, Bronson, MI (US)

(73) Assignee: Morgan Olson LLC, Sturgis, MI (US)

( * ) Notice: Subject to any disclaimer, the term of this patent is extended or adjusted under 35 U.S.C. 154(b) by 480 days.

(21) Appl. No.: 17/685,079

(22) Filed: Mar. 2, 2022

(65) Prior Publication Data

US 2022/0282541 A1 Sep. 8, 2022

Related U.S. Application Data

(60) Provisional application No. 63/155,344, filed on Mar. 2, 2021.

(51) Int. Cl.
*E05D 15/12* (2006.01)
*B60R 21/02* (2006.01)
(Continued)

(52) U.S. Cl.
CPC ............ *E05D 15/12* (2013.01); *B60R 21/026* (2013.01); *E06B 3/469* (2013.01); *B60J 5/06* (2013.01);
(Continued)

(58) Field of Classification Search
CPC ... E05D 15/12; E05D 15/063; E05D 15/0652; E05D 15/0656; E06B 3/469;
(Continued)

(56) References Cited

U.S. PATENT DOCUMENTS 1,960,860 A * 5/1934 Allen ...................... E05D 15/12 49/102
3,805,450 A * 4/1974 Forcina .................. E05D 15/08 49/404

(Continued)

FOREIGN PATENT DOCUMENTS

JP 3035224 B2 * 4/2000
JP 2003041857 A * 2/2003

(Continued)

OTHER PUBLICATIONS

JP 2003-41857 (Year: 2003).*
JP 3035224 (Year: 2000).*
KR 20180112942 (Year: 2018).*

*Primary Examiner* — Daniel P Cahn
*Assistant Examiner* — Patrick B. Ponciano
(74) *Attorney, Agent, or Firm* — Ballard Spahr LLP

(57) ABSTRACT

A vehicle sliding door assembly for selectively covering a bulkhead transit passage. The assembly includes a first door panel slidable between a first door closed position and a first door open position. A second door panel is slidable between a second door closed position and a second door open position. The first door panel includes a first door leading edge and a first door following edge. The second door panel includes a second door leading edge. The first door following edge engages the second door leading edge moving the doors in concert from the open position to the closed position. The first door leading edge engages the second door leading edge moving the doors in concert from the closed position to the open position.

19 Claims, 4 Drawing Sheets

(51) Int. Cl.
*E06B 3/46* (2006.01)
*B60J 5/06* (2006.01)
*E05D 15/06* (2006.01)

(52) U.S. Cl.
CPC ........ *E05D 15/063* (2013.01); *E05D 15/0652* (2013.01); *E05D 15/0656* (2013.01); *E05Y 2201/64* (2013.01); *E05Y 2201/684* (2013.01); *E05Y 2201/688* (2013.01); *E05Y 2900/516* (2013.01); *E05Y 2900/518* (2013.01); *E05Y 2900/531* (2013.01)

(58) Field of Classification Search
CPC . B60R 21/026; B62D 33/042; E05Y 2201/64; E05Y 2201/684; E05Y 2201/688; E05Y 2900/531; E05Y 2900/516; E05Y 2900/518
See application file for complete search history.

(56) References Cited

U.S. PATENT DOCUMENTS

| | | | | | | |
|---|---|---|---|---|---|---|
| 4,848,832 | A | * | 7/1989 | Starnes | B60P 3/32 | 296/190.11 |
| 5,069,497 | A | * | 12/1991 | Clelland | B60R 21/026 | 52/207 |
| 5,246,261 | A | * | 9/1993 | McCormack | B60R 21/026 | 296/24.41 |
| 5,357,143 | A | * | 10/1994 | Lehr | E05B 77/54 | 307/10.1 |
| 5,469,666 | A | * | 11/1995 | Lewis, Jr. | E06B 1/70 | 52/177 |
| 5,532,521 | A | * | 7/1996 | Leininger | E05B 47/026 | 180/289 |
| 5,657,581 | A | * | 8/1997 | Husting | A47K 3/34 | 49/411 |
| 7,159,915 | B2 | * | 1/2007 | Corey | B60N 2/24 | 296/64 |
| 7,174,944 | B1 | * | 2/2007 | Clark | E05D 15/08 | 49/424 |
| 7,346,939 | B2 | * | 3/2008 | Perry | A47K 3/34 | 4/557 |
| 7,909,379 | B2 | * | 3/2011 | Winget | B60R 21/026 | 410/129 |
| 8,474,894 | B2 | * | 7/2013 | Gerhardt | B60P 3/423 | 296/24.43 |
| 9,234,376 | B2 | * | 1/2016 | Trulaske, Sr. | E05D 15/0652 | |
| 9,631,409 | B2 | * | 4/2017 | Wang | E05F 17/00 | |
| 11,548,462 | B2 | * | 1/2023 | Camellini | E05D 15/0686 | |
| 11,946,313 | B2 | * | 4/2024 | Sperandio | E06B 1/70 | |
| 2013/0042534 | A1 | * | 2/2013 | Polus | E05D 15/0673 | 49/425 |
| 2019/0277075 | A1 | * | 9/2019 | Jeffries | E05D 15/0686 | |
| 2023/0202417 | A1 | * | 6/2023 | Gravel | B60R 13/0823 | 296/24.43 |
| 2023/0272656 | A1 | * | 8/2023 | Storck, III | E05F 5/06 | 296/24.3 |

FOREIGN PATENT DOCUMENTS

| | | | | | |
|---|---|---|---|---|---|
| JP | 2009091756 | A | * | 4/2009 | |
| WO | WO-2023084380 | A1 | * | 5/2023 | E05C 9/04 |

* cited by examiner

VEHICLE SLIDING DOOR ASSEMBLY, AND METHODS OF MAKING AND USING SAME

CROSS-REFERENCE TO RELATED APPLICATION

This application claims priority to and the benefit of the filing date of U.S. Provisional Patent Application No. 63/155,344, filed Mar. 2, 2021, which is incorporated herein by reference in its entirety.

FIELD

The present application is directed to transportation vehicles and, in particular, to Class-B walk-in vehicles (e.g., vans) and methods of production thereof.

BACKGROUND

Conventional walk-in delivery vehicles normally have a bulkhead that separates the cab area from the load or storage area. However, the bulkhead often must allow travel of drivers and carried cargo between the cab area and the storage area. The bulkheads, therefore, commonly have a passage area that is closed or opened by way of a door mounted to the bulkhead. The bulkhead or partition often consists of fixed panels on each side of a sliding door. Vehicle widths often limit the amount of clear door opening available as the sliding door only has so much room to move to the side of the opening. Clear door opening is the amount of physical open space to pass through when a vehicle door is in the open position. In addition, many designs require a passenger jump seat to be mounted on the bulkhead, further limiting the amount of clear door opening available. It would, therefore, be beneficial to have a bulkhead door assembly that could accommodate various vehicle widths and other bulkhead requirements, such as jump seats, while maximizing the amount of clear door opening through the bulkhead.

SUMMARY

Described herein, in various aspects, is a vehicle sliding door assembly for selectively covering a bulkhead transit passage. The assembly, in one aspect, includes a first door panel slidable between a first door closed position and a first door open position. It also includes a second door panel slidable between a second door closed position and a second door open position. The first door panel includes a first door leading edge and a first door following edge. Similarly, the second door panel includes a second door leading edge. The first door following edge engages the second door leading edge when the first door panel is moved from the first door open position to the first door closed position. This engagement forces the second door panel to move from the second door open position to the second door closed position. When the first door panel is moved from the first door open position to the first door closed position, the first door leading edge engages the second door leading edge to move the second door panel into the second door open position.

In another aspect, the sliding door assembly can include a first door hook mounted on the first door following edge, a first door catch mounted on the first door leading edge, and a second door hook mounted on the second door leading edge. In this aspect, when the first door panel is moved from the first door open position to the first door closed position, the first door hook engages the second door hook which drags the second door panel from the second door open position to the second door closed position. When the first door panel is moved from the first door closed position to the first door open position, the first door catch engages the second door hook and moves the second door panel from the second door closed position to the second door open position.

In another aspect, the sliding door assembly may include an upper door track. The first door panel and the second door panel are slidably engaged to the upper door track in a cantilever arrangement.

In one particular aspect, the upper door track includes an elongated channel having a first channel guide and a second channel guide. A plurality of first mounting elements are slidably engaged within the first channel guide, and a plurality of second mounting elements are slidably engaged within the second channel guide. Each of the mounting elements may have mounting posts positioned thereon. The first door panel is mounted to one or more first mounting posts positioned on the first mounting elements, and the second door panel is mounted to one or more second mounting posts positioned on the second mounting elements. This allows the first and second door panels to be supported in a cantilever arrangement while allowing horizontal sliding movement between open and closed positions.

In one aspect, the sliding door assembly can include a fixed panel mounted to the upper door track. The fixed panel and the first door panel form a pocket that houses the second door panel when the first door panel is in the first door open position.

In another aspect, the sliding door assembly can include a bottom door guide having a first guide track and a second guide track running parallel to each other. The first door panel, being supported by the upper door track, floats within the first guide track. As used herein, "floating" is meant to convey that the first guide track does not support the weight of the first door panel but rather acts solely as a position guide. Similarly, the second door panel floats within the second guide track.

In one aspect, the first guide track and the second guide track have semi-circular cross-sections. The first door panel may have a first semi-circular bottom edge positioned in the first guide track. Similarly, the second door panel may have a second semi-circular bottom edge positioned in the second guide track.

In another aspect, the bottom door guide may include one or more ramp surfaces positioned external to the first and second guide tracks. This allows devices such as trolleys or other wheeled devices to pass through the bulkhead transit passage with ease.

In one aspect, the sliding door assembly may include a slam latch mounted to secure the first door panel in the first door closed position. In another aspect, the sliding door assembly may include a door stop (such as a plunger engagement) to secure the first door panel in the first door open position.

Described herein is also a method of mounting a sliding door to a vehicle. In this aspect, a bulkhead is mounted to the vehicle, the bulkhead defining a bulkhead transit passage. A first door panel is slidably mounted to the bulkhead and is movable between a first door open position and a first door closed position. The first door panel includes a first door leading edge and a first door following edge. A second door panel is also slidably mounted to the bulkhead and is movable between a second door open position and a second door closed position. The second door panel includes a second door leading edge. The first door panel is mounted such that the first door following edge engages the second door leading edge when the first panel door is moved from the first door open position to the first door closed position. This engagement forces the second door panel to move from the second door open position to the second door closed position. Similarly, the first door panel is also mounted such that the first door leading edge engages the second door leading edge when the first door panel is moved from the first door closed position to the first door open position. This engagement forces the second panel door to move from the second door closed position to the second door open position.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
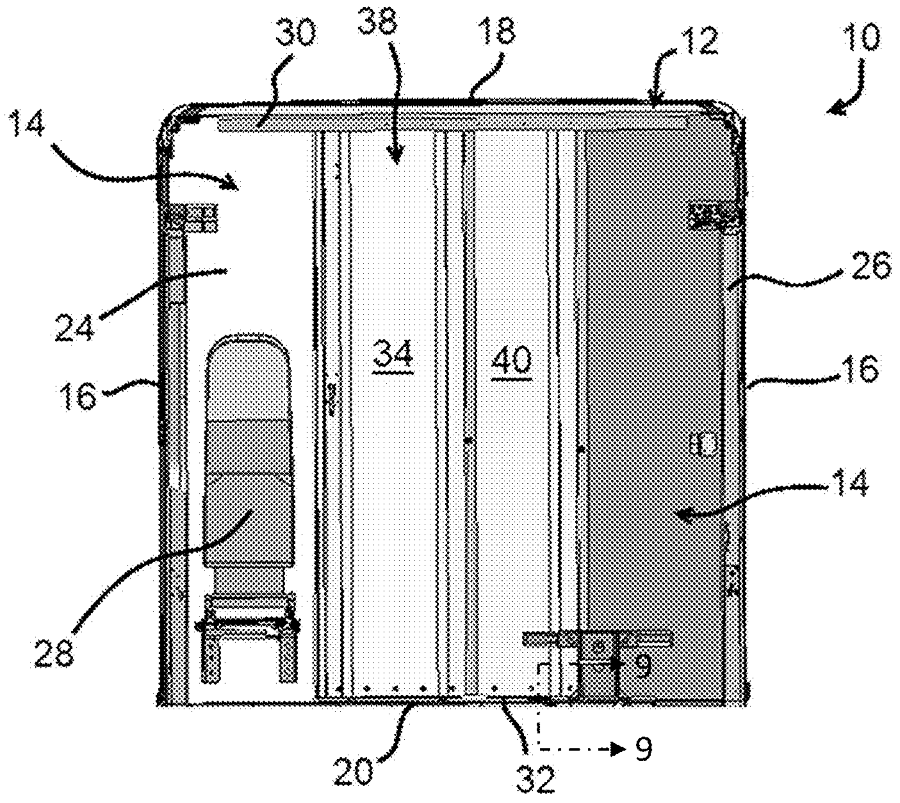
FIG. 1 is a rear view of an exemplary sliding door assembly installed in an exemplary vehicle according to the disclosure.

The disclosed sliding door assembly now will be described more fully hereinafter with reference to the accompanying drawings, in which some, but not all embodiments of the sliding door assembly are shown. Indeed, the sliding door assembly may be embodied in many different forms and should not be construed as limited to the embodiments set forth herein; rather, these embodiments are provided so that this disclosure will satisfy applicable legal requirements. It is to be understood that the present disclosure is not limited to the particular methodology and protocols described, as such may vary. It is also to be understood that the terminology used herein is for the purpose of describing particular embodiments only, and is not intended to limit the scope of the present disclosure.

Many modifications and other embodiments of the sliding door assembly set forth herein will come to mind to one skilled in the art to which the invention pertains having the benefit of the teachings presented in the foregoing description and the associated drawings. Therefore, it is to be understood that the sliding door assembly and associated vehicles and methods are not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms “a”, “an,” and “the” include plural referents unless the context clearly dictates otherwise. For example, use of the term “a pedal” can refer to one or more of such pedals.

All technical and scientific terms used herein have the same meaning as commonly understood to one of ordinary skill in the art to which this invention belongs unless clearly indicated otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

As used herein, the terms “optional” or “optionally” mean that the subsequently described event or circumstance may or may not occur, and that the description includes instances where said event or circumstance occurs and instances where it does not.

The word “or” as used herein means any one member of a particular list and also includes any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Disclosed herein, in various aspects and with reference to the FIG. 1, is a sliding door assembly 10 for mounting in a vehicle 12. The disclosed sliding door assembly 10 is suitable for a large number of vehicles of different sizes and configurations. In one aspect, the sliding door assembly 10 is particularly suited for mounting between a cabin portion of the vehicle 12 (e.g., a delivery vehicle) and a storage or package section of the vehicle 12 (cabin and storage areas not shown).

Figure 2:
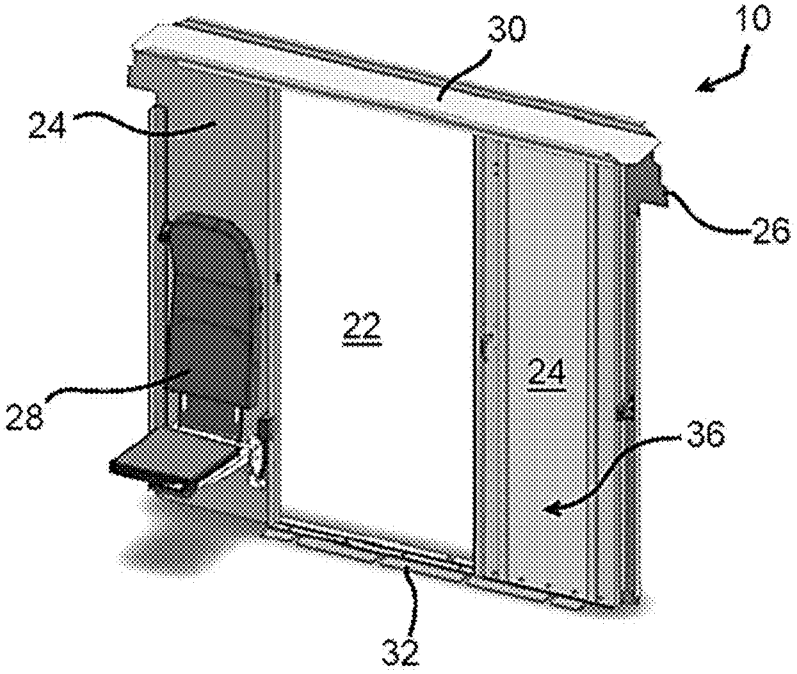
FIG. 2 is a perspective detail of the sliding door assembly as in FIG. 1.

The sliding door assembly 10 includes a bulkhead 14 mounted within the vehicle 12. The bulkhead 14 may be secured to the vehicle 12 though connection on any of the vehicle sidewalls 16, the vehicle roof 18 or the vehicle floor 20. A wide variety of connection methodologies are contemplated as specific aspects of connection methodologies are discussed later in this application. The bulkhead 14 defines a bulkhead transit passage 22 as shown in FIG. 2. In one aspect, this is formed directly in the bulkhead 14 material. In another aspect, the bulkhead 14 may comprise a first bulkhead panel 24 and a second bulkhead panel 26 mounted in the vehicle 12 in a spaced relation to form the bulkhead transit passage 22. The sliding door assembly 10, in some aspects, may include a jump seat 28 mounted to the bulkhead 14 to allow for the transportation of passengers or delivery agents within the vehicle 12. The sliding door assembly 10 may include an upper door track 30 mounted to the bulkhead 14 above the bulkhead transit passage 22 and a bottom door guide 32 mounted below the bulkhead transit passage 22. In at least one aspect, the upper door track 30 may be mounted to the vehicle roof 18, and the bottom door guide 32 may be mounted to the vehicle floor 20. For many applications, it is important to maximize the bulkhead transit passage 22 to allow sufficient space for transit of both personnel and cargo. The limited width of certain vehicles 12 may limit the size of the bulkhead transit passage 22. In addition, additional equipment, such as the jump seat 28, mounted to the bulkhead 14 and the need to accommodate doors or other closures may further limit the passage size. Therefore, the present disclosure maximizes the bulkhead transit passage 22 while accommodating such necessities.

Figure 3:
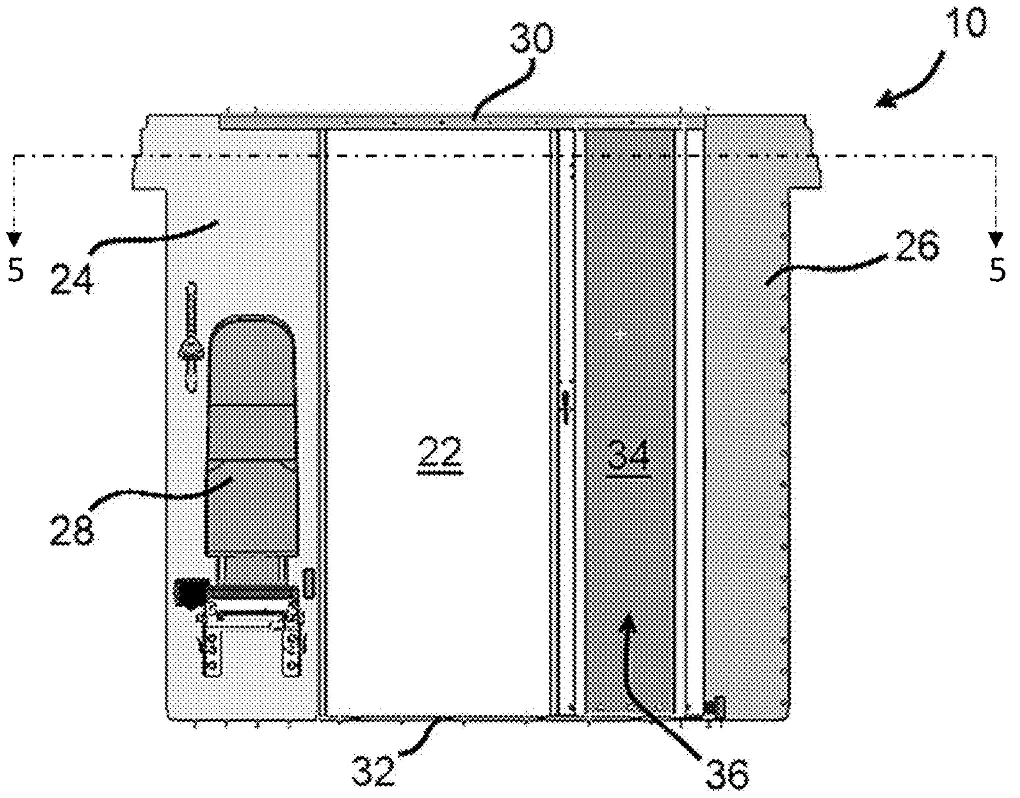
FIG. 3 is a rear facing interior view of the sliding door assembly as in FIG. 2, the first and second door panels shown in the open position.
Figure 4:
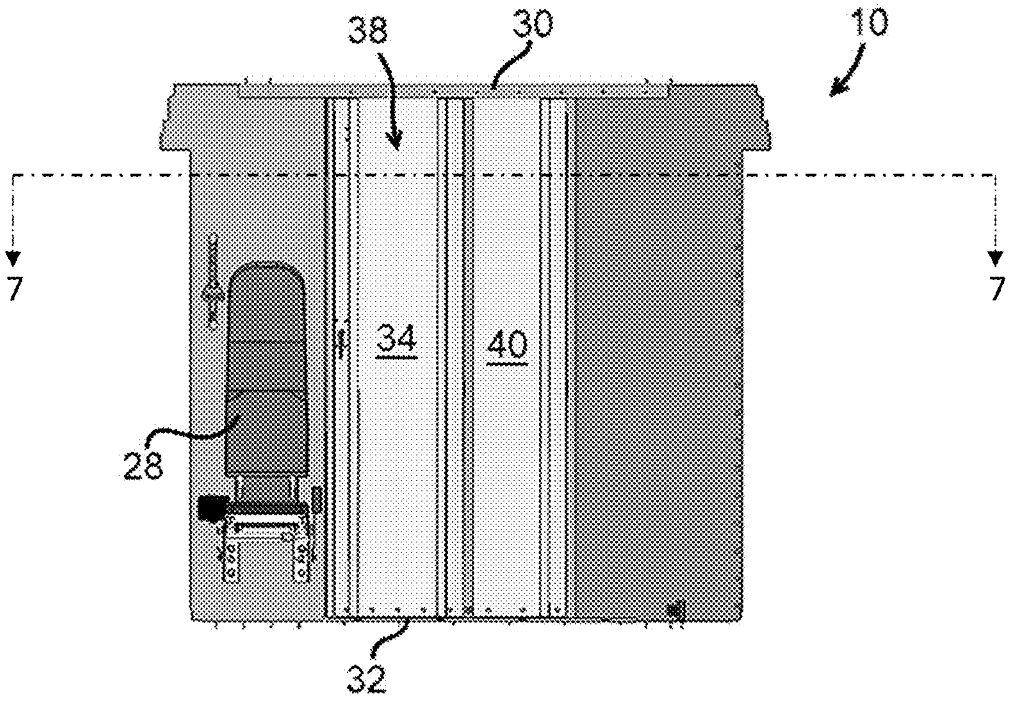
FIG. 4 is a rear facing interior view of the sliding door assembly as in FIG. 2, the first and second door panels shown in the closed position.

The sliding door assembly 10 may further include a first door panel 34 slidably mounted to the bulkhead 14. In one aspect, the first door panel 34 is slidably engaged to the upper door track 30 in a cantilevered arrangement. In this arrangement, the upper door track 30 supports the entire weight of the first door panel 34 while allowing it to slide in the horizontal direction parallel with the bulkhead 14. The first door panel 34 is also slidably engaged to the bottom door guide 32 in a floating arrangement. The term “floating” or “float” in intended to describe that the weight of the first door panel 34 is solely supported by the upper door track 30 and not the bottom door guide 32. The first door panel 34 floats in the bottom door guide 32 as it is not in direct contact with the bottom door guide 32 except to keep in horizontal alignment with the bulkhead 14. The first door panel 34 is movable between a first door open position 36 (as shown in FIG. 3) and a first door closed position 38 (as shown in FIG. 4). The movement of the first door panel 34 between the first door open position 36 and the first door closed position 38 is also shown in FIGS. 5-7.

The sliding door assembly 10 further includes a second door panel 40 slidably mounted to the bulkhead 14. In one aspect, the second door panel 40 is slidably engaged to the upper door track 30 in a cantilevered arrangement. In this arrangement, the upper door track 30 supports the entire weight of the second door panel 40 while allowing it to slide in the horizontal direction parallel with the bulkhead 14. The second door panel 40 is also slidably engaged to the bottom door guide 32 in a floating arrangement. The term “floating” or “float” in intended to describe that the weight of the second door panel 40 is solely supported by the upper door track 30 and not the bottom door guide 32. The second door panel 40 floats in the bottom door guide 32 as it is not in direct contact with the bottom door guide 32 except to keep in horizontal alignment with the bulkhead 14. The second door panel 40 is movable between a second door open position 42 (as shown in FIG. 3) and a second door closed position 44 (shown in FIG. 7). The movement of the second door panel 40 between the second door open position 42 and the second door closed position 44 is also shown in FIGS. 5-7.

Figure 5:
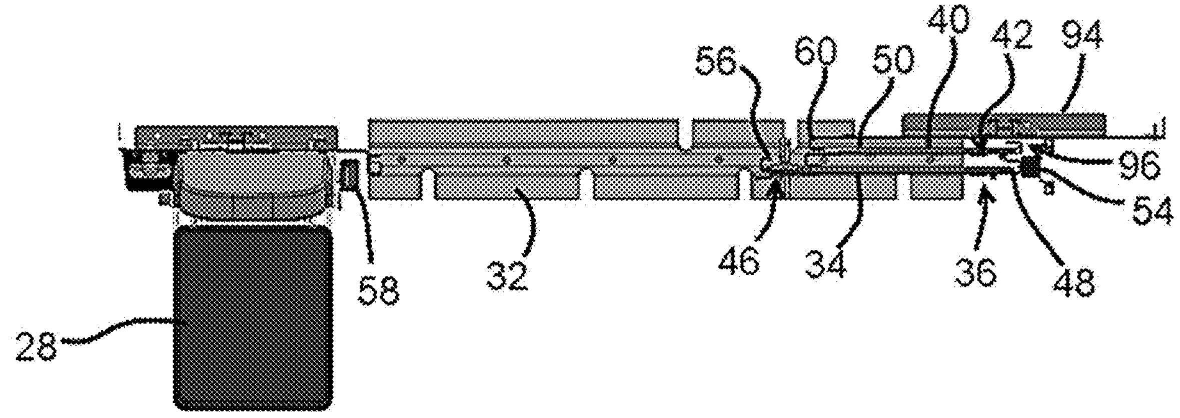
FIG. 5 is a cross-sectional view taken along line 5-5 in FIG. 3.
Figure 6:
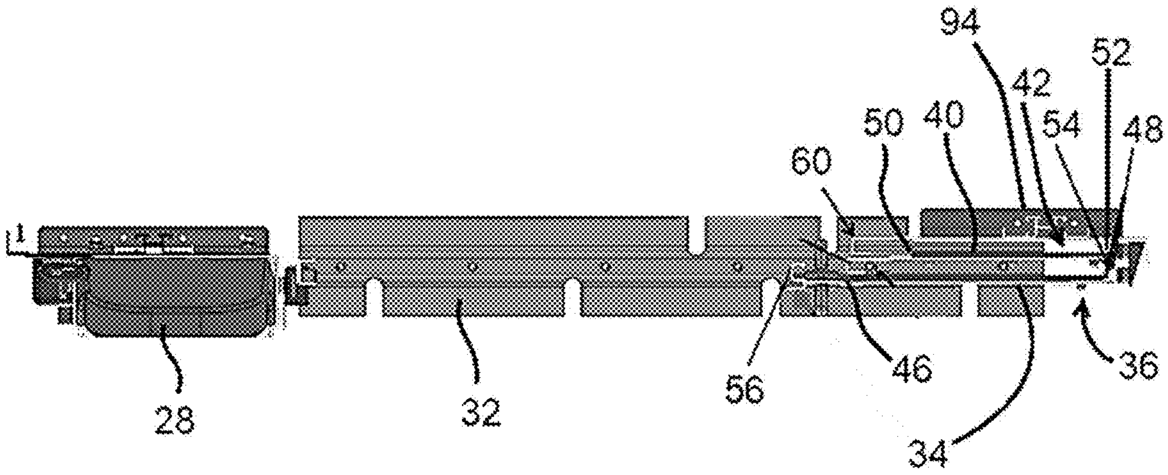
FIG. 6 is an alternative top down cross-sectional view of the sliding door assembly as shown in FIG. 5.
Figure 7:
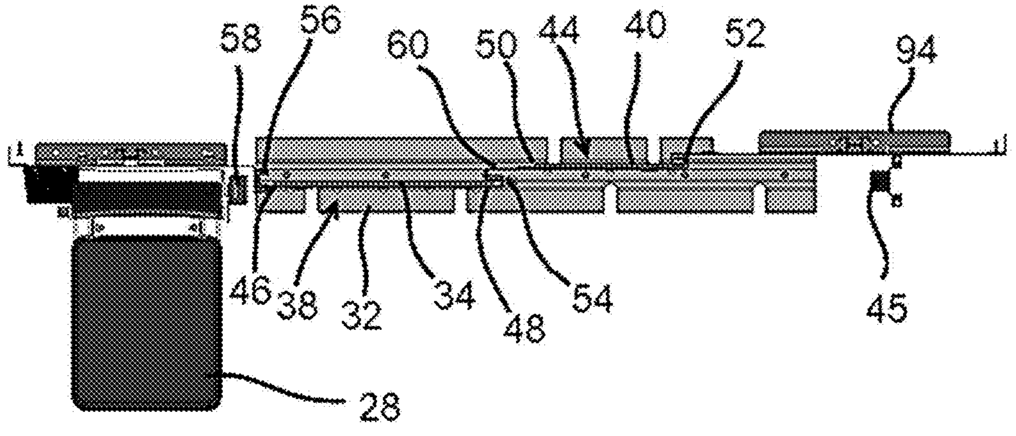
FIG. 7 is a cross-sectional view taken along line 7-7 in FIG. 4.

Disclosed in FIGS. 5-7, one aspect of the interaction between the first door panel 34 and the second door panel 40 is shown. In this aspect, the first door panel 34 includes a first door leading edge 46 and a first door following edge 48. The terms “leading” and “following” are merely utilized to give orientation of the first door panel 34 side edges wherein the term “leading” is indicative of the side edge that is closest to bulkhead transit passage 22 when the first door panel 34 is in the first door closed position 38. The second door panel 40 also includes a second door leading edge 50 and a second door following edge 52. As shown in FIG. 5 and FIG. 7, when the first door panel 34 is moved from the first door open position 36 (FIG. 5) to the first door closed position 38 (FIG. 7), the first door following edge 48 engages the second door leading edge 50 thereby moving the second door panel 40 from the second door open position 42 to the second door closed position 44. When the first door panel 34 is moved from the first door closed position 38 (FIG. 7) to the first door open position 36 (FIG. 5), the first door leading edge 46 engages the second door leading edge 50 thereby moving the second door panel 40 from the second door closed position 44 (FIG. 7) to the second door open position 42 (FIG. 5).

Although the afore described engagement between the first door panel 34 and the second door panel 40 may be accomplished in a variety of configurations, in one aspect the first door panel 34 includes a first door hook 54 mounted on the first door following edge 48. A first door catch 56 may be mounted on the first door leading edge 46. Although a variety of first door catch 56 configurations are possible, one aspect contemplates the first door catch 56 comprises a slam latch catch so that it may engage a slam latch 58 mounted on the bulkhead 14 to secure the first door panel 34 when in the first door closed position 38. The second door panel 40 includes a second door hook 60 mounted on the second door leading edge 50. As the first door panel 34 is moved from the first door open position 36 (FIG. 5) to the first door closed position 38 (FIG. 7), the first door hook 54 engages the second door hook 60 thereby moving the second door panel 40 from the second door open position 42 to the second door closed position 44. When the first door panel 34 is moved from the first door closed position 38 (FIG. 7) to the first door open position 36 (FIG. 5), the first door catch 56 engages the second door hook 60 thereby moving the second door panel 40 from the second door closed position 44 (FIG. 7) to the second door open position 42 (FIG. 5). The vehicle sliding door assembly 10 may further include a door stop 45 mounted to the bulkhead 14. The door stop 45 frictionally engages the first door hook 54 when the first door panel 34 is in the first door open position 38 to prevent movement. In one aspect, the door stop 45 may comprise a plunger assembly. When the first door panel 34 is desired to be moved out of the first door open position 38, the frictional force need only be overcome.

Figure 8:
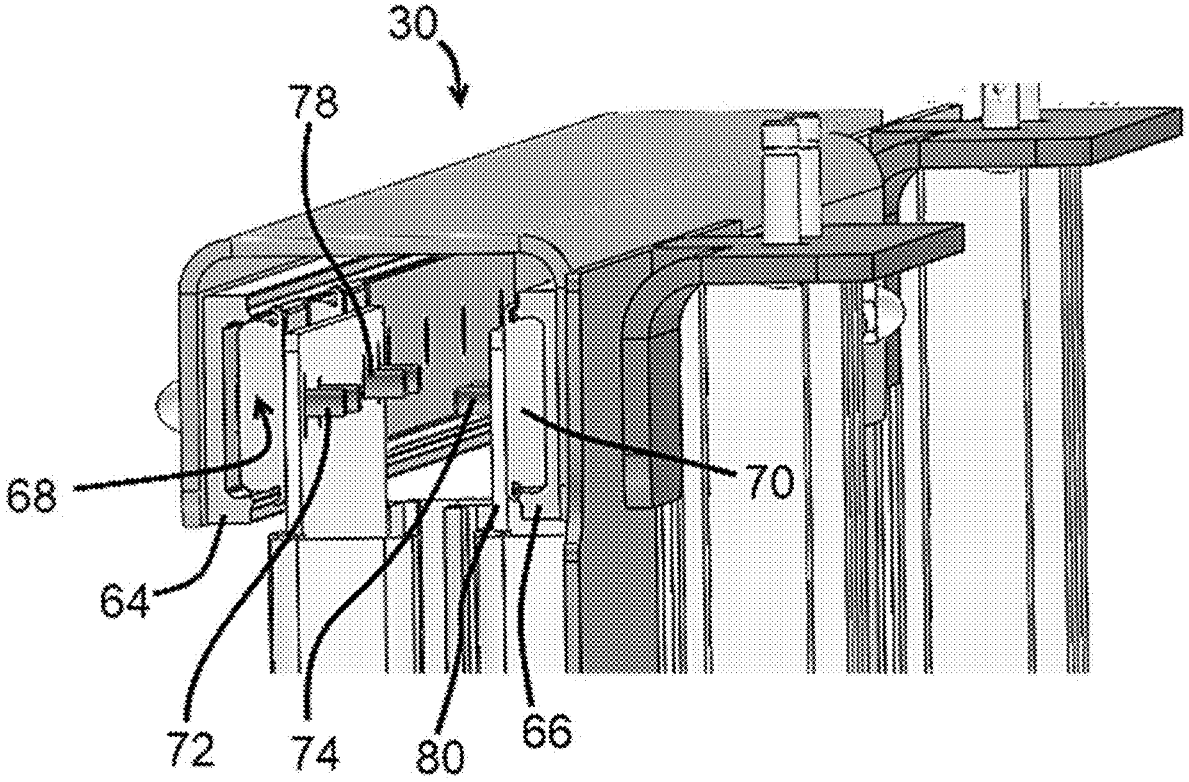
FIG. 8 is a partial perspective end view of an exemplary sliding door assembly showing details of the upper door track.

Disclosed in FIG. 8, one particular aspect of mounting the first panel door 34 and the second panel door 36 to the upper door track 30 is shown. In this aspect, the upper door track 30 is comprised on an elongated channel 62 containing a first channel guide 64 and a second channel guide 66. A plurality of first mounting elements 68 are slidably engaged in the first channel guide 64, and a plurality of second mounting elements 70 are slidably engaged in the second channel guide 66. Each of the plurality of first mounting elements 68 may include one or more first mounting posts 72 extending outwardly. Similarly, each of the plurality of second mounting elements 70 may include one or more second mounting posts 74 extending outwardly. In turn, the first door panel 34 may include a plurality of first door upper mounts 76 containing a plurality of first door receiving guides 78. The plurality of first mounting posts 72 may be retained after passing through the plurality of first door receiving guides 78 to secure the first door panel 34 to the upper door track 30 in a cantilevered arrangement. Similarly, the second door panel 40 may include a plurality of second door upper mounts 80 having a plurality of second door receiving guides 82 or engaging the one or more second mounting posts 74 in an identical fashion as the engagement of the first door panel 34.

Figure 9:
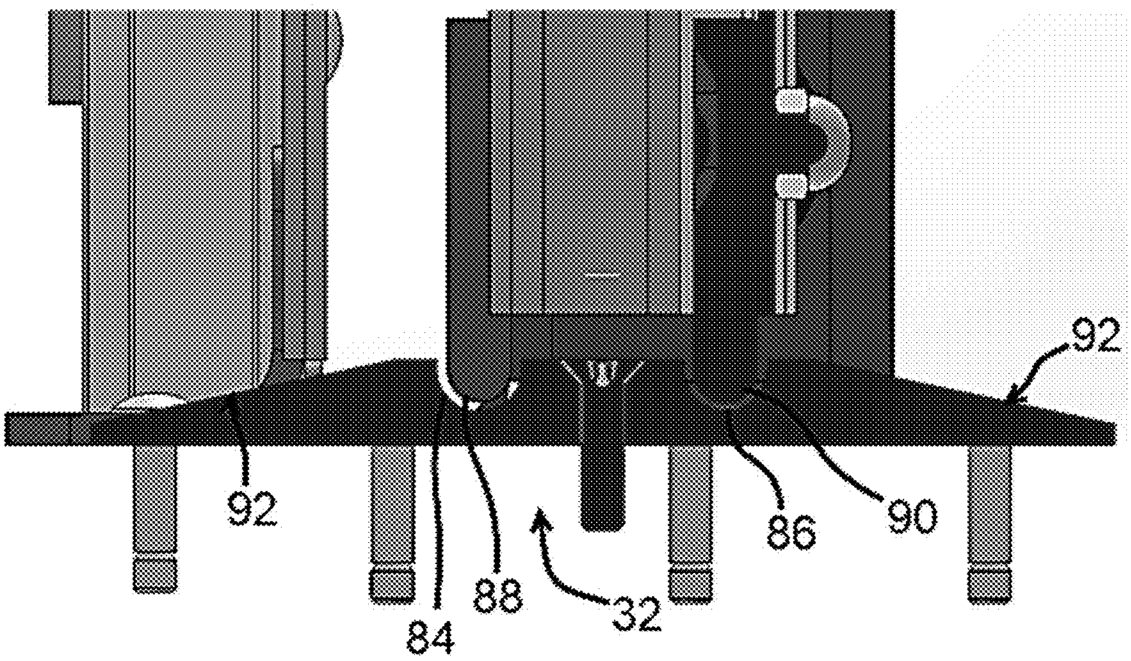
FIG. 9 is a cross sectional view of an exemplary sliding door assembly showing details of the bottom door guide, taken in the plane 9-9 of FIG. 1.

Disclosed in FIG. 9 is one aspect of the bottom door guide 32. In this aspect, the bottom door guide 32 includes a first guide track 84 and a second guide track 86 running parallel to each other. The first door panel 34 floats within the first guide track 84 and the second door panel 40 floats within the second guide track 86. As can be seen in FIG. 9, the first door panel 34 and second door panel 40 do not rest or sit on the bottom of the guide tracks 84/86 but float above them. In one aspect, the first and second guide tracks 84/86 may include a semi-circular cross section. In this aspect, the first door panel 34 may include a first semi-circular bottom edge 88 and the second door panel 40 may include a second semi-circular bottom edge 90. This configuration allows for smooth but controlled movements of the first and second door panels 34/40 within the bottom door guide 32. The bottom door guide 32 may further include one or more ramp surfaces 92 positioned externally from the first and second guide tracks 84/86. It is contemplated that this configuration can allow equipment to be easily rolled over the bottom door guide 32 and through the bulkhead transit passage 22.

In an additional aspect of the disclosure shown in FIG. 5, the sliding door assembly 10 may include a fixed panel 94 mounted to the bulkhead 14. The fixed panel 94 works in concert with the first door panel 34 to form a pocket 96 for the second door panel 40 when the first door panel 34 is in the first door open position 36.

Although the foregoing invention has been described in some detail by way of illustration and example for purposes of clarity of understanding, certain changes and modifications may be practiced within the scope of the appended claims.

What is claimed is:

1. A vehicle sliding door assembly for selectively covering a bulkhead transit passage, the sliding door assembly comprising:

a first door panel slidable between a first door open position and a first door closed position, said first door panel comprising a first door leading edge and a first door following edge;

at least one second door panel slidable between a second door open position and a second door closed position, said at least one second door panel comprising a second door leading edge;

an upper door track having a first longitudinal end portion and a second longitudinal end portion spaced along a longitudinal axis, said first door panel and said at least one second door panel slidably coupled to said upper door track;

a first fixed panel immovably mounted to said upper door track at said first longitudinal end portion of said upper door track, wherein the first fixed panel has:

a width along the longitudinal axis that is sufficient to fully support a jump seat attached thereto, a height along a vertical axis, and a thickness transverse to the longitudinal axis, wherein the height is greater than the width, and wherein the width is greater than the thickness; and a second fixed panel immovably mounted to said second longitudinal end portion of said upper door track, wherein said second fixed panel is spaced from said first fixed panel along said longitudinal axis to define the bulkhead transit passage therebetween, wherein said second fixed panel is elongated along the vertical axis, said second fixed panel has a first surface and said first door panel has a second surface parallel to said first surface of said second fixed panel, wherein said first surface of said second fixed panel and said second surface of said first door panel cooperate to form a pocket for storing said at least one second door panel when said first door panel is in the first door open position, wherein the second door panel has opposite edges spaced along the longitudinal axis, and wherein, when said first door panel is in the first door open position, an axis perpendicular to the second surface and equally spaced from each of the opposite edges of the second door panel along the longitudinal axis intersects each of the second fixed panel, the first door panel, and the second door panel;

wherein said first door following edge engages said second door leading edge when said first door panel is moved into said first door closed position, forcing said at least one second door panel into said second door closed position; and wherein said first door leading edge engages said second door leading edge when said first door panel is moved into said first door open position, forcing said at least one second door panel into said second door open position.

2. The sliding door assembly of claim 1, further comprising:

a first door hook mounted on said first door following edge;

a first door catch mounted on said first door leading edge; and a second door hook mounted on said second door leading edge;

wherein said first door hook engages said second door hook when said first door panel is moved into the first door closed position forcing said at least one second door panel into said second door closed position; and wherein said first door catch engages said second door hook when said first door panel is moved into the first door open position forcing said at least one second door panel into said second door open position.

3. The sliding door assembly of claim 1, wherein said first door panel and said second door panel are coupled to said upper door track in a cantilever arrangement.

4. The sliding door assembly according to claim 3, wherein said upper door track comprises:

an elongated channel having a first channel guide and a second channel guide;

one or a plurality of first mounting elements slidably engaged to said first channel guide, wherein each first mounting element of said one or said plurality of first mounting elements includes one or more first mounting posts;

one or a plurality of second mounting elements slidably engaged to said second channel guide, wherein each second mounting element of said one or said plurality of second mounting elements includes one or more second mounting posts;

wherein said first door panel is mounted to said one or more first mounting posts; and wherein said at least one second door panel is mounted to said one or more second mounting posts.

5. The sliding door assembly according to claim 1, further comprising:

a bottom door guide comprising a first guide track and a second guide track, said first guide track and said second guide track being parallel to each other;

wherein said first door panel floats within said first guide track; and wherein said second door panel floats within said second guide track.

6. The sliding door assembly according to claim 5, wherein said first guide track and said second guide track comprise semi-circular cross sections.

7. The sliding door assembly according to claim 6, wherein said first door panel comprises a first semi-circular bottom edge positioned within said first guide track; and wherein said at least one second door panel comprises a second semi-circular bottom edge positioned within said second guide track.

8. The sliding door assembly according to claim 5, wherein said bottom door guide comprises one or more ramp surfaces positioned externally to said first guide track and said second guide track.

9. The sliding door assembly of claim 5, wherein said second fixed panel extends to said bottom door guide along said vertical axis.

10. The sliding door assembly of claim 1, wherein said first fixed panel has a height along the vertical axis and a thickness along a third axis that is perpendicular to each of the vertical and longitudinal axes, wherein the height of the first fixed panel is greater than the width of the first fixed panel, and wherein the width of the first fixed panel is greater than the thickness of the first fixed panel.

11. The sliding door assembly of claim 1, wherein the second fixed panel is configured to be positioned on a left side of the bulkhead transit passage.

12. A sliding door assembly for use in a vehicle, comprising:

a bulkhead defining a bulkhead transit passage;

an upper door track having a first longitudinal end portion and a second longitudinal end portion spaced along a longitudinal axis, wherein said upper door track is mounted to said bulkhead above said bulkhead transit passage;

a bottom door guide mounted to said bulkhead below said bulkhead transit passage;

a first door panel positioned between said upper door track and said bottom door guide, said first door panel slidable between a first door open position and a first door closed position, said first door panel comprising a first door leading edge and a first door following edge;

at least one second door panel positioned between said upper door track and said bottom door guide, said at least one second door panel slidable between a second door open position and a second door closed position, said at least one second door panel comprising a second door leading edge;

a first fixed panel immovably mounted to said bulkhead at said first end portion of said upper door track, wherein the first fixed panel has:

a width along the longitudinal axis that is sufficient to fully support a jump seat attached thereto, a height along a vertical axis, and a thickness transverse to the longitudinal axis, wherein the height is greater than the width, and wherein the width is greater than the thickness; and a second fixed panel immovably mounted to said bulkhead, wherein said second fixed panel is elongated along the vertical axis, wherein said second fixed panel is spaced from said first fixed panel along said longitudinal axis, said second fixed panel has a first surface and said first door panel has a second surface parallel to said first surface of said second fixed panel, wherein said first surface of said second fixed panel and said second surface of said first door panel cooperate to form a pocket for storing said at least one second door panel when said first door panel is in the first door open position, wherein the second door panel has opposite edges spaced along the longitudinal axis, and wherein, when said first door panel is in the first door open position, an axis perpendicular to the second surface and equally spaced from each of the opposite edges of the second door panel along the longitudinal axis intersects each of the second fixed panel, the first door panel, and the second door panel;

a first door hook mounted on said first door following edge;

a first door catch mounted on said first door leading edge; and a second door hook mounted on said second door leading edge;

wherein said first door hook engages said second door hook when said first door panel is moved into the first door closed position, forcing said at least one second door panel into said second door closed position; and wherein said first door catch engages said second door hook when said first door panel is moved into said first door open position, forcing said at least one second door panel into said second door open position.

13. The sliding door assembly according to claim 12, wherein said first door panel and said at least one second door panel are slidably engaged to said upper door track in a cantilever arrangement.

14. The sliding door assembly according to claim 12, wherein said first door panel floats within a first guide track formed in said bottom door guide; and wherein said at least one second door panel floats within a second guide track formed in said bottom door guide.

15. The sliding door assembly according to claim 12, wherein said upper door track comprises:

an elongated channel having a first channel guide and a second channel guide;

one or a plurality of first mounting elements slidably engaged to said first channel guide, wherein each first mounting element of said one or said plurality of first mounting elements includes one or more first mounting posts;

one or a plurality of second mounting elements slidably engaged to said second channel guide, wherein each second mounting element of said one or said plurality of second mounting elements includes one or more second mounting posts;

wherein said first door panel is mounted to said one or more first mounting posts; and wherein said at least one second door panel is mounted to said one or more second mounting posts.

16. The sliding door assembly according to claim 15, wherein said first door panel comprises at least one first door upper mount including at least one first door receiving guide, said at least one first door receiving guide engaging said one or more first mounting posts; and wherein said at least one second door panel comprises at least one second door upper mount including at least one second door receiving guide, said at least one second door receiving guide engaging said one or more second mounting posts.

17. The sliding door assembly according to claim 12, further comprising:

a door stop mounted to said bulkhead, said door stop retaining said first door hook when said first door panel is in said first door open position.

18. The sliding door assembly of claim 12, further comprising a jump seat mounted to the first fixed panel, wherein the jump seat comprises a pivotable seat portion and a backrest, wherein the pivotable seat portion is configured to support a passenger seated therein.

19. The sliding door assembly of claim 18, wherein the width of the first fixed panel is greater than a width of the jump seat.

* * * * *